(12) United States Patent
Silberberg

(10) Patent No.: US 9,234,751 B2
(45) Date of Patent: Jan. 12, 2016

(54) BUBBLE LEVEL

(71) Applicant: Mark L Silberberg, Fallbrook, CA (US)

(72) Inventor: Mark L Silberberg, Fallbrook, CA (US)

( * ) Notice: Subject to any disclaimer, the term of this patent is extended or adjusted under 35 U.S.C. 154(b) by 296 days.

(21) Appl. No.: 13/925,544

(22) Filed: Jun. 24, 2013

(65) Prior Publication Data

US 2014/0007438 A1    Jan. 9, 2014

Related U.S. Application Data

(63) Continuation-in-part of application No. 13/528,623, filed on Jun. 20, 2012, now Pat. No. 9,021,710.

(51) Int. Cl.
*G01C 9/26* (2006.01)
*G01C 9/28* (2006.01)

(52) U.S. Cl.
CPC ... *G01C 9/26* (2013.01); *G01C 9/28* (2013.01)

(58) Field of Classification Search
CPC .............. G01C 9/24; G01C 9/26; G01C 9/28; G01C 9/34
USPC ........... 33/347, 350, 370, 371, 372, 373, 376, 33/379, 381
See application file for complete search history.

(56) References Cited

U.S. PATENT DOCUMENTS

| | | | |
|---|---|---|---|
| 2,635,350 A | 4/1953 | Bettega | |
| 2,748,494 A | 6/1956 | Raney | |
| 2,810,206 A * | 10/1957 | Ziemann | 33/383 |
| 2,900,729 A * | 8/1959 | Basile | 33/451 |
| 4,663,856 A * | 5/1987 | Hall et al. | 33/373 |
| D301,553 S | 6/1989 | Makofsky et al. | |
| D332,226 S | 1/1993 | Hutchins et al. | |
| D355,134 S | 2/1995 | Kennedy | |
| D371,309 S | 7/1996 | Webb | |
| D389,758 S | 1/1998 | Motamed | |
| 5,743,691 A | 4/1998 | Donovan | |
| D395,013 S | 6/1998 | Webb | |
| D409,100 S | 5/1999 | Brimer | |
| D411,470 S | 6/1999 | Webb | |
| 6,173,502 B1 * | 1/2001 | Scarborough | 33/371 |
| 6,502,322 B2 * | 1/2003 | Smochek | 33/373 |
| 6,915,588 B1 * | 7/2005 | Gay | 33/451 |
| 6,918,187 B2 * | 7/2005 | Schaefer | 33/365 |
| D509,158 S * | 9/2005 | Silberberg | D10/69 |
| D538,186 S | 3/2007 | Silberberg | |
| D539,679 S | 4/2007 | Silberberg | |
| 7,398,600 B2 * | 7/2008 | Ming | 33/347 |

(Continued)

FOREIGN PATENT DOCUMENTS

JP    2000298018 A  * 10/2000  ............... G01C 9/28

*Primary Examiner* — R. A. Smith
(74) *Attorney, Agent, or Firm* — James E. Brunton

(57) ABSTRACT

A bubble type level for determining the orientation of a structure, such as an elongate pipe, that includes several differently oriented bubble vials that are secured within the level body in a manner such that if the bubble vials become broken or otherwise damaged, they can be easily replaced and the level need not be discarded. The bubble type level of the invention also includes a body portion having top and bottom rails that are chamfered in a manner to automatically align the level with the longitudinal axis of the pipe when the level is connected to the side of the pipe. The level further includes a plurality of longitudinally spaced magnets that are connected to the bottom rail of the level and can be used to releasably interconnect the level with a length of ferrous pipe.

19 Claims, 6 Drawing Sheets

(56) References Cited

U.S. PATENT DOCUMENTS

| | | | |
|---|---|---|---|
| 7,644,506 B2 * | 1/2010 | Wong | 33/373 |
| D613,194 S | 4/2010 | Silberberg | |
| 7,802,372 B1 * | 9/2010 | Silberberg | 33/451 |
| 7,946,045 B2 | 5/2011 | Allemand | |
| 8,061,051 B2 | 11/2011 | Allemand | |
| 2007/0266578 A1 * | 11/2007 | Tran et al. | 33/379 |
| 2010/0131015 A1 | 5/2010 | Kozak | |
| 2011/0119941 A1 * | 5/2011 | Steele et al. | 33/379 |

\* cited by examiner

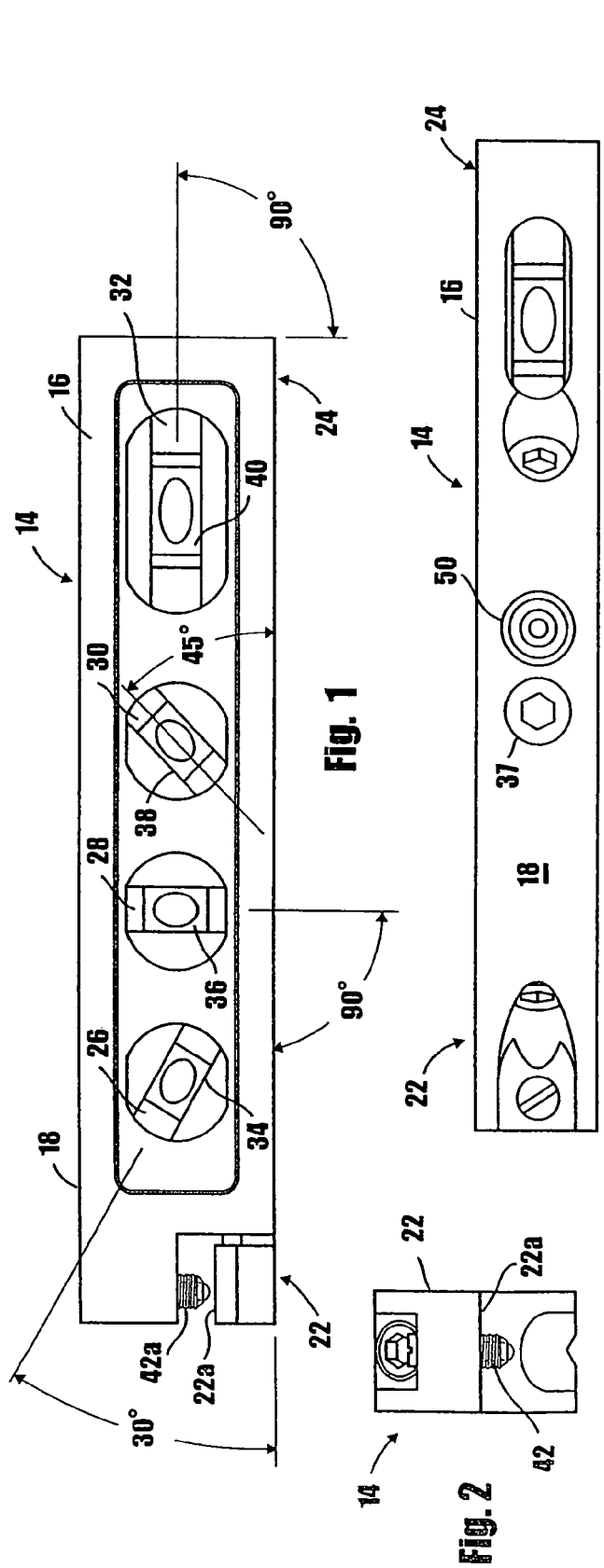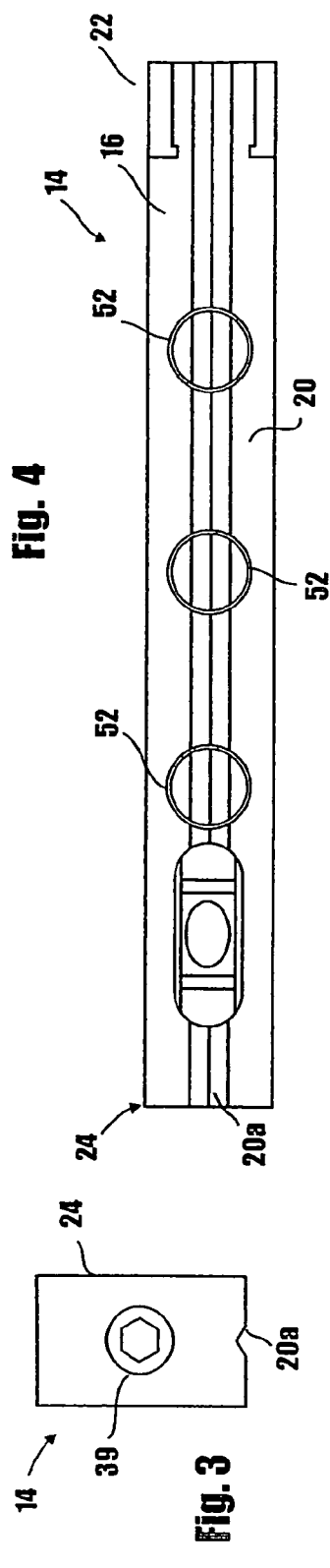

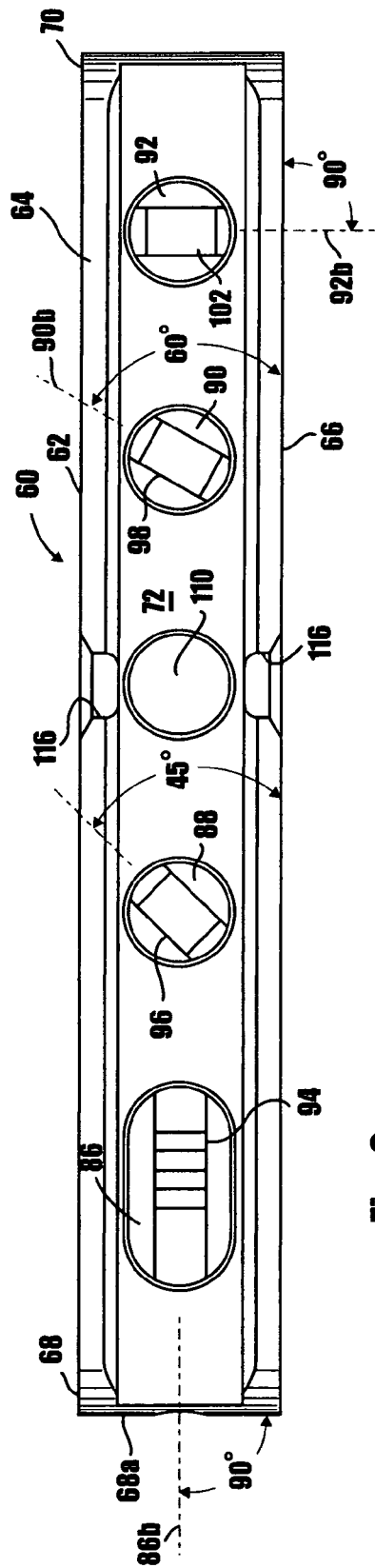
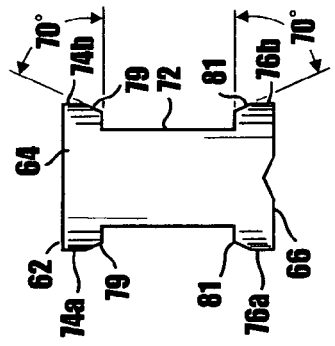
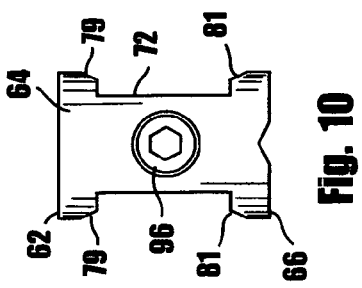
Fig. 9
Fig. 10
Fig. 11

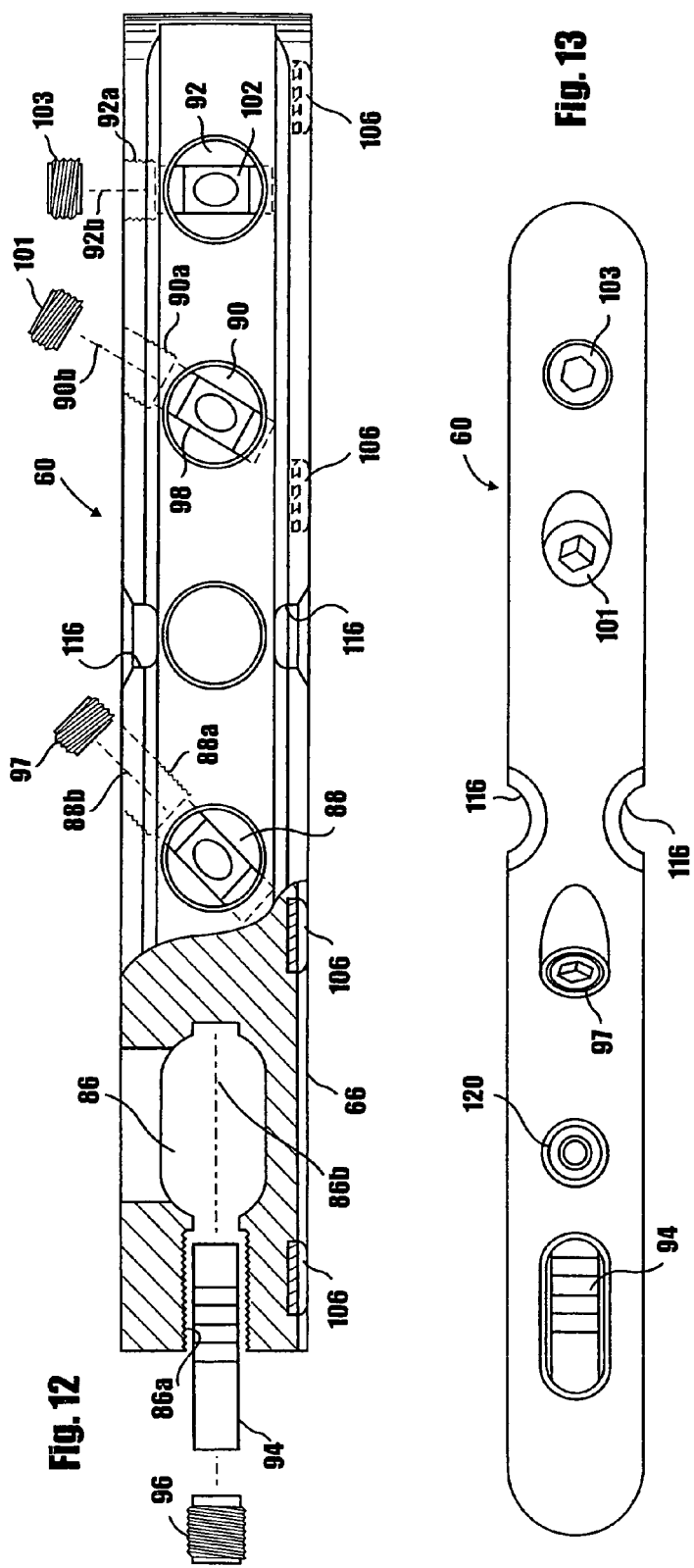
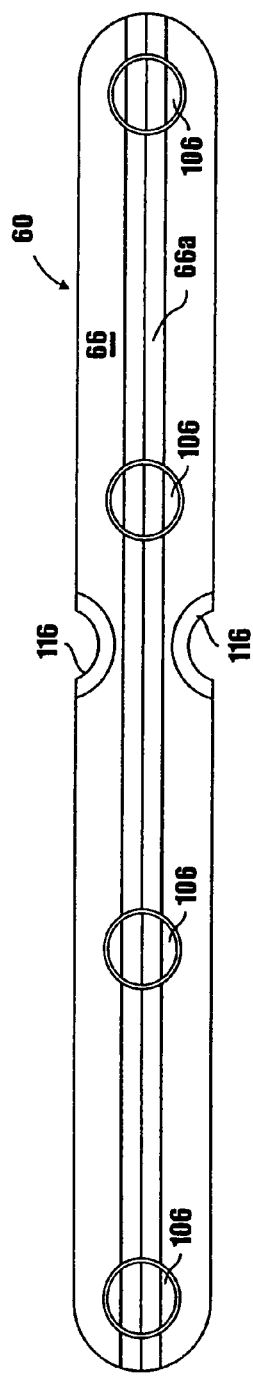
Fig. 12
Fig. 13
Fig. 14

BUBBLE LEVEL

CROSS-REFERENCE TO RELATED APPLICATIONS

This is a Continuation In Part of co-pending U.S. application Ser. No. 13/528,623 filed Jun. 20, 2012.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to tools used in the construction industry. More particularly, the invention concerns a specially designed bubble level having replaceable bubble vials and including a novel connector mechanism for releasably connecting the level to the structure to be leveled.

2. Description of Related Art Including Information Disclosed Under 37 CFR 1.97 and 1.98

Bubble levels of various designs have been suggested in the past and are widely used by construction workers to determine the orientation of a particular structure or surface with respect to a reference axis. A typical bubble level generally comprises an elongated body that has a pair of opposing, generally parallel working surfaces and includes a plurality of openings having bubble vials permanently secured therein. The bubble vials are typically aligned in different directions relative to the working surfaces and function to indicate the orientation of a structure. For example, one vial may be aligned in a direction perpendicular to the working surfaces, another may be aligned in a direction parallel to the working surfaces and a third may be aligned in an angular direction. Typically, the vial contains a fluid and a bubble, and the user views the position of the bubble within the vial to determine the position of the tool relative to the working surfaces.

A novel and highly useful level construction is disclosed in U.S. Pat. No. 7,802,372 issued to the present inventor. This patent, which is entitled "Removable Laser Base Attachment for Bubble Levels", describes a bubble level that includes a body, a laser beam generator, and a removable securement. The body has a flat top surface that the level is secured to and a bottom surface that is flat and parallel to the top surface. A laser diode mounted in a module emits a visible laser beam upon application of power from a battery that is controlled by a switch. The module, batteries, and switch are mounted in a through bore in the body. The laser base is removably secured to the bubble level by any manner appropriate to the shape of the level. In one such securement, the level has a T-shaped cross-section and the body has a complementary slot into which the level slides. When the level reference surface abuts the top surface of the laser base, a thumb screw is tightened to frictionally secure the level in the base.

BRIEF SUMMARY OF THE INVENTION

It is an object of the present invention to provide a bubble type level for determining the orientation of a structure that includes a plurality of differently oriented bubble vials that are secured within the level body in a manner such that, if any one of the bubble vials become broken, or otherwise damaged, it can be easily replaced and the level need not be discarded.

Another object of the invention is to provide a bubble type level of the afore mentioned character in which the bubble vials are securely held in position within threaded chambers formed in the level body by easily removable threaded cap screws.

Another object of the invention is to provide a bubble type level of the character described which is specially designed for determining the orientation of a structure, such as an elongate length of pipe.

Another object of the invention is to provide a bubble type level of the character described in the preceding paragraph that includes several unique connector mechanisms that enable the level to be quickly and easily removably interconnected with the pipe. In one form of the invention, the connector mechanisms include a series of longitudinally spaced magnets that are carried by the bottom surface of the level and can be used to permit the level to be conveniently, removably connected to any ferrous pipe. In another form of the invention the connector mechanisms include an elastomeric strap that can be used to removably connect the level to the pipe.

Another object of the invention is to provide a bubble type level of the character described in the preceding paragraphs that includes uniquely configured top and bottom rails that are chamfered in a manner to automatically align the level with the longitudinal axis of the pipe when the level is connected to the side of the pipe.

Yet another object of the invention is to provide a bubble type level of the type described in the preceding paragraphs that includes a bulls-eye level that is mounted on the top surface of the level body proximate the center of the level.

These and other objects of the invention will be realized by the level construction illustrated in the drawings and described in the paragraphs that follow.

BRIEF DESCRIPTION OF SEVERAL VIEWS OF THE DRAWINGS

FIG. 1 is a side elevational view of one form of the leveling device of the invention.

FIG. 2 is a right end view of the leveling device shown in FIG. 1.

FIG. 3 is a left end view of the leveling device shown in FIG. 1.

FIG. 4 is a top plan view of the leveling device shown in FIG. 1.

FIG. 5 is a bottom plan view of the leveling device shown in FIG. 1.

FIG. 9 is a side elevational view of an alternate form of leveling device of the invention.

FIG. 10 is a left end view of the leveling device shown in FIG. 9.

FIG. 11 is a right end view of the leveling device shown in FIG. 9.

FIG. 12 is a side elevational, exploded view partially in cross-section of the leveling device of the embodiment shown in FIG. 9.

FIG. 13 is a top plan view of the leveling device shown in FIG. 9.

FIG. 14 is a bottom plan view of the leveling device shown in FIG. 9.

FIG. 17 is an enlarged view taken along lines 17-17 of FIG. 15.

DETAILED DESCRIPTION OF THE INVENTION

Figure 6:
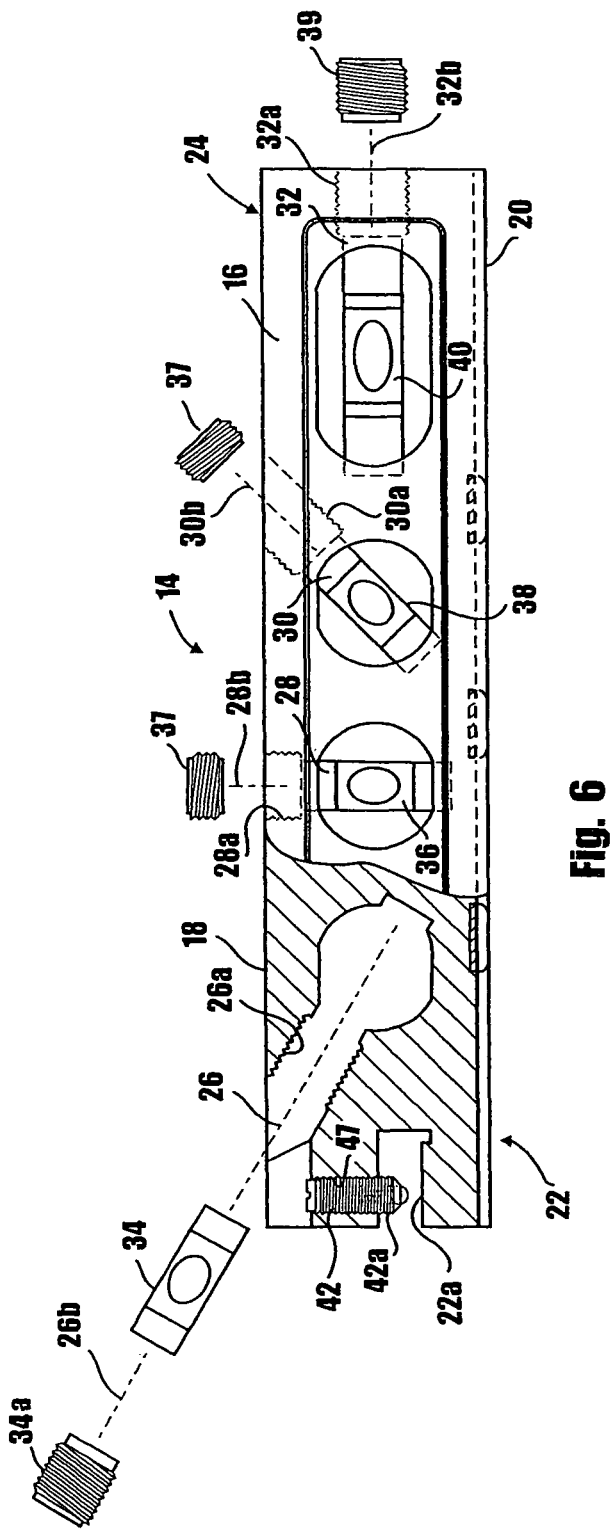
FIG. 6 is a side elevational, exploded view partially in cross-section of the leveling device of the invention.

Referring to the drawings and particularly to FIGS. 1 through 6, one form of the level of the invention for determining the orientation of a structure is there shown and generally designated by the numeral 14. Level 14 here comprises an elongate body 16 having a top surface 18, a bottom surface 20 and first and second end portions 22 and 24, respectively. For a purpose presently to be discussed, first end portion 22 is provided with a slot 22a. As best seen in FIGS. 3 and 5, bottom surface 20 is provided with a longitudinally extending, generally "V" shaped groove 20a.

As best seen in FIGS. 1 and 6 of the drawings, body 16 has a plurality of differently oriented vial chambers 26, 28, 30 and 32. Vial chamber 26 has a threaded end portion 26a and a central axis 26b that is disposed at an angle of approximately 30 degrees with respect to bottom surface 20. Vial chamber 28 has a threaded end portion 28a and a central axis 28b that is disposed at an angle of approximately 90 degrees with respect to bottom surface 20. Vial chamber 30 has a threaded end portion 30a and a central axis 30b that is disposed at an angle of approximately 45 degrees with respect to bottom surface 20. Vial chamber 32 has a threaded end portion 32a and a central axis 32b that is disposed in a generally parallel relationship with bottom surface 20. It is to be understood that the angles of the axes of the central axis of each of the vial chambers can vary depending upon the end use of the improved level.

A conventional bubble vial 34 is disposed within vial chamber 26 and is uniquely removably secured there within by a threaded connector that is threadably receivable within threaded opening 26a of vial chamber 26. The threaded connector, which is here provided in the form of a conventional cap screw 34a (FIG. 6), is moveable between first and second positions to secure the bubble vial 34 within vial chamber 26 (FIG. 1). A conventional bubble vial 36 is disposed within vial chamber 28 and is uniquely removably secured there within by a threaded connector that is threadably receivable within threaded opening 28a of vial chamber 28. The threaded connector, which is also here provided in the form of a conventional cap screw (FIGS. 3 and 6), is moveable between first and second positions to secure the bubble vial 36 within vial chamber 28 (FIG. 1). In similar manner, a conventional bubble vial 38 is disposed within vial chamber 30 and is uniquely removably secured there within by a threaded connector that is threadably receivable within threaded opening 30a of vial chamber 30. Once again, the threaded connector is provided in the form of a conventional cap screw 37 (FIGS. 3 and 6) that is moveable between first and second positions to secure the bubble vial 38 within vial chamber 30 (FIG. 1).

In like manner, as shown in FIG. 1, a conventional bubble vial 40 is disposed within vial chamber 32 and is removably secured there within by a conventional cap screw 39 (FIG. 6) which is moveable between first and second positions to secure the bubble vial 40 within vial chamber 32.

With the construction thus described, any one of the bubble vials of the level can be conveniently removed and replaced by simply removing the threaded cap screw from the threaded end portion of the vial chamber and then by removing the bubble vial from its chamber. Unlike the prior art levels, if a given bubble vial is broken or otherwise damaged, it can be easily replaced and the level need not be discarded.

Figure 7:
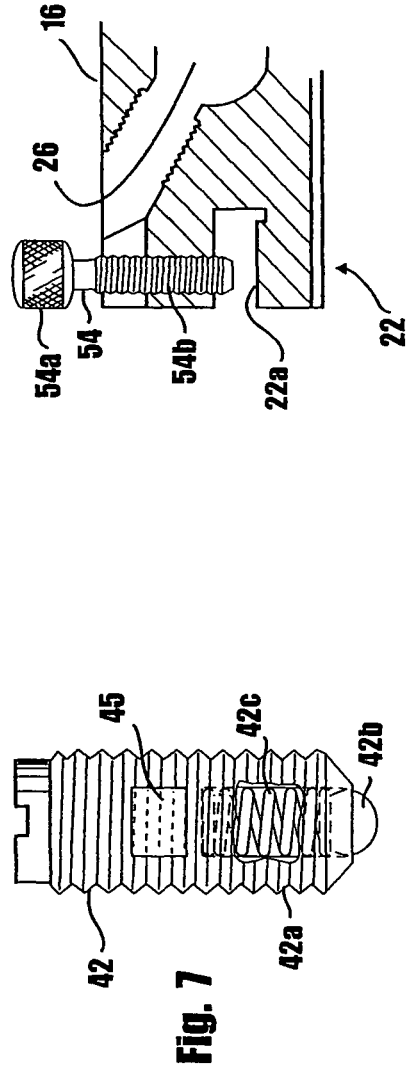
FIG. 7 is a greatly enlarged, side elevational view of the spring ball screw component of the leveling device of the invention.

Another highly important feature of the present invention resides in the provision of a connector mechanism for releasably interconnecting body 16 with the structure to be leveled. The connector mechanism, which is here provided in the form of a conventional, self-contained ball-and-spring device 42, is threadably connected to body 16 proximate first end portion 22. As depicted in FIG. 7, the self-contained ball-and-spring device 42 has a threaded shank portion 42a that, when the device is threadably connected to the level body, at least partially extends into slot 22a of the first end portion of the body (FIG. 6). Ball-and-spring device 42 also includes a ball 42b and a biasing spring 42c that are arranged in the manner illustrated in FIG. 7.

As illustrated in FIG. 7, shank portion 42a of the ball-and-spring device 42 includes a nylon patch 45 that functions to prevent the device from accidentally moving within threaded portion 47 of the end portion 22 due to vibration.

Self-contained ball-and-spring devices 42, which are suitable for the present purpose, are readily commercially available from several sources including the Carr Lane Manufacturing Co. of St. Louis, Mo.

Turning now to FIG. 4 of the drawings, another important feature of the present invention resides in the provision of a bulls-eye level 50 that is mounted on the top surface 18 of body 16 proximate the center of the level. Bulls-eye level 50 is readily commercially available from several sources including the Johnson Level & Tool Mfg. Co., Inc. of Mequon, Wis.

Referring to FIG. 5, still another important feature of the present invention resides in the provision of a plurality of longitudinally spaced magnets 52 that are connected to the bottom surface 20 of body 16. In use, these magnets permit the level to be conveniently, removably connected to any ferrous structure that is being leveled. Magnets 52 are readily commercially available from several sources including Applied Magnets of Plano, Tex.

Figure 8:
FIG. 8 is a fragmentary, cross-sectional view of the right end portion of an alternate form of the leveling device of the invention.

Turning now to FIG. 8, an alternate form of connector mechanism for releasably interconnecting body 16 with the structure to be leveled is there shown. This alternate form of connector mechanism is provided in the form of a conventional screw 54 that has a knurled head 54a and threaded shank portion 54b. When the device is threadably connected to the level body 16 in the manner shown in FIG. 8, threaded shank portion 54b at least partially extends into slot 22a of the first end portion of body 16.

Referring next to FIGS. 9 through 18, an alternate form of the bubble level of the invention for determining the orientation of a structure, such as a pipe, is there shown and generally designated by the numeral 60. Level 60 is similar in some respects to the level shown in FIGS. 1 through 8 and here comprises an elongate body 62 having a top rail 64, a bottom rail 66 and first and second end portions 68 and 70, respectively. Top rail 64 and bottom rail 66 cooperate to define a recessed central portion 72. Bottom rail 66 has a bottom surface 66a that is provided with a longitudinally extending, generally "V" shaped groove 66a (FIG. 14).

Figure 16:
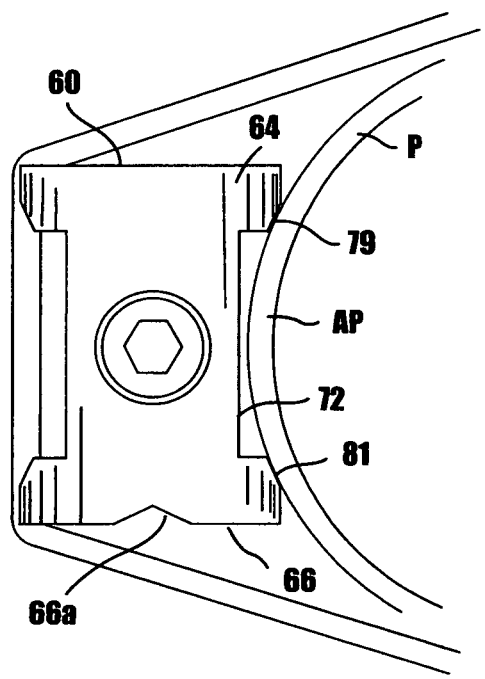
FIG. 16 is an enlarged fragmentary view taken along lines 16-16 of FIG. 15.
Figure 18:
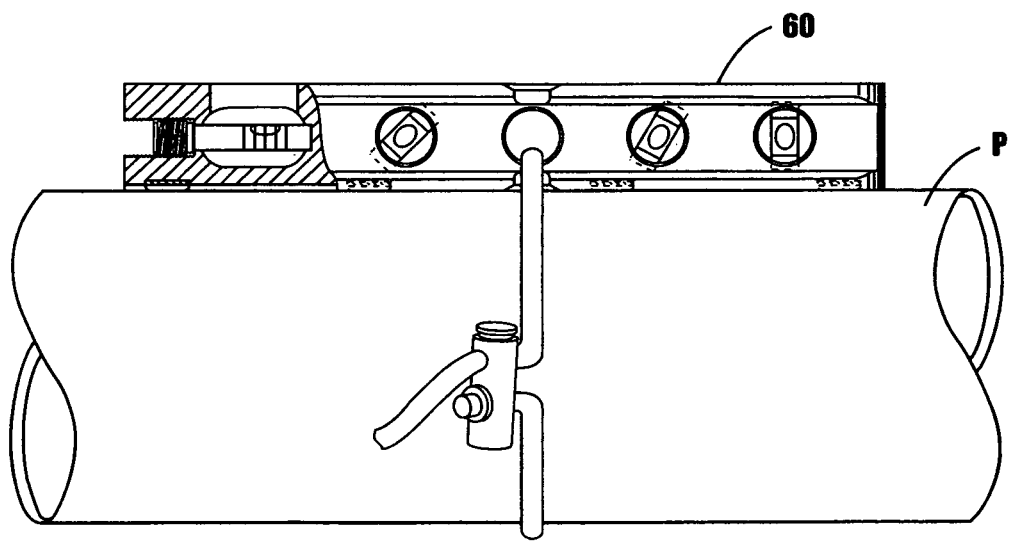
FIG. 18 is an enlarged view taken along lines 18-18 of FIG. 17.

As best seen in FIGS. 10 and 11 of the drawings, top rail 64 has transversely spaced apart, chamfered sides 74a and 74b, while bottom rail 66 has transversely spaced apart, chamfered sides 76a and 76b. For reasons presently to be discussed, this novel rail configuration forms an important aspect of the present invention. When the level is positioned against the side of the elongate pipe "P" in a manner presently to be described, the chamfered surfaces 79 and 81 of the top and bottom rails respectfully engage the side of the pipe in a manner to automatically align the level with the longitudinal axis of the pipe. As indicated in FIG. 16, the top and bottom rails are uniquely configured so that when the level is interconnected with the pipe, an arcuate portion "AP" of the side of the pipe is received within the recessed central portion 72. In this regard, the angle of the chamfer on the sides of the top and bottom rails can range between about 60 and 80 degrees, but is preferably on the order of about 70 degrees (see FIG. 11).

As best seen in FIGS. 9 and 12 of the drawings, body 62 has a plurality of differently oriented vial chambers 86, 88, 90 and 92. Vial chamber 86 has a threaded end portion 86a and a central axis 86b that is disposed at an angle of approximately 90 degrees with respect to the end surface 68a of end portion 68 (FIG. 9). Vial chamber 88 has a threaded end portion 88a and a central axis 88b that is disposed at an angle of approximately 45 degrees with respect to bottom surface 66 (FIG. 9). Vial chamber 90 has a threaded end portion 90a and a central axis 90b that is disposed at an angle of approximately 60 degrees with respect to bottom surface 66. Vial chamber 92 has a threaded end portion 92a and a central axis 92b that is disposed at an angle of approximately 90 degrees with respect to bottom surface 66. It is to be understood that the angles of the axes of the central axis of each of the vial chambers can vary depending upon the end use of the improved level.

A conventional bubble vial 94 is disposed within vial chamber 86 and is uniquely removably secured there within by a threaded connector that is threadably receivable within threaded opening 86a of vial chamber 86. The threaded connector, which is here provided in the form of a conventional cap screw 96 (FIG. 12), is moveable between first and second positions to secure the bubble vial 94 within vial chamber 86 (FIG. 9). A conventional bubble vial 96 is disposed within vial chamber 88 and is uniquely removably secured there within by a threaded connector that is threadably receivable within threaded opening 88a of vial chamber 88. The threaded connector, which is also here provided in the form of a conventional cap screw 97 (FIG. 12), is moveable between first and second positions to secure the bubble vial 96 within vial chamber 88 (FIG. 9). In similar manner, a conventional bubble vial 98 is disposed within vial chamber 90 and is uniquely removably secured there within by a threaded connector that is threadably receivable within threaded opening 90a of vial chamber 90. Once again, the threaded connector is provided in the form of a conventional cap screw 101 (FIG. 12) that is moveable between first and second positions to secure the bubble vial 98 within vial chamber 90 (FIG. 9). In like manner, as shown in FIG. 9, a conventional bubble vial 102 is disposed within vial chamber 92 and is removably secured there within by a conventional cap screw 103 (FIG. 12) which is moveable between first and second positions to secure the bubble vial 102 within vial chamber 92.

With the construction thus described, any one of the bubble vials of the level can be conveniently removed and replaced by simply removing the threaded cap screw from the threaded end portion of the vial chamber and then by removing the bubble vial from its chamber. Unlike the prior art levels, if a given bubble vial is broken or otherwise damaged, it can be easily replaced and the level need not be discarded.

Referring to FIG. 14, still another important feature of the present invention resides in the provision of a plurality of longitudinally spaced magnets 106 that are connected to the bottom surface 66 of body 62. In use, these magnets permit the level to be conveniently, removably connected to any ferrous structure, such as a ferrous pipe (see FIG. 17), that is being leveled. Magnets 106 are readily commercially available from several sources including Applied Magnets of Plano, Tex. As illustrated in FIG. 17, magnets 106 can be used to permit the level to be conveniently, removably connected to the upper surface of the ferrous pipe "P".

In another form of the invention, the level can be conveniently, removably connected to the upper surface of the pipe by an alternate form of connector mechanism that here comprises an elongated elastomeric strap assembly 108 that can be used to removably connect the level to the pipe. More particularly, in this latest form of the invention, body 62 of the level is provided with a through opening 110 through which the free end 112a of the elastomeric strap 112 of the strap assembly 108 can be threaded in the manner illustrated in FIG. 17. Strap assembly 108 also includes a conventional connector member 114, to which the second end 112b of the elastomeric strap is connected. After the free end of the strap has been threaded through opening 110 it can be threaded through the connector member 114 so as to enable the ends of the elastomeric strap to be releasably interconnected.

Figure 15:
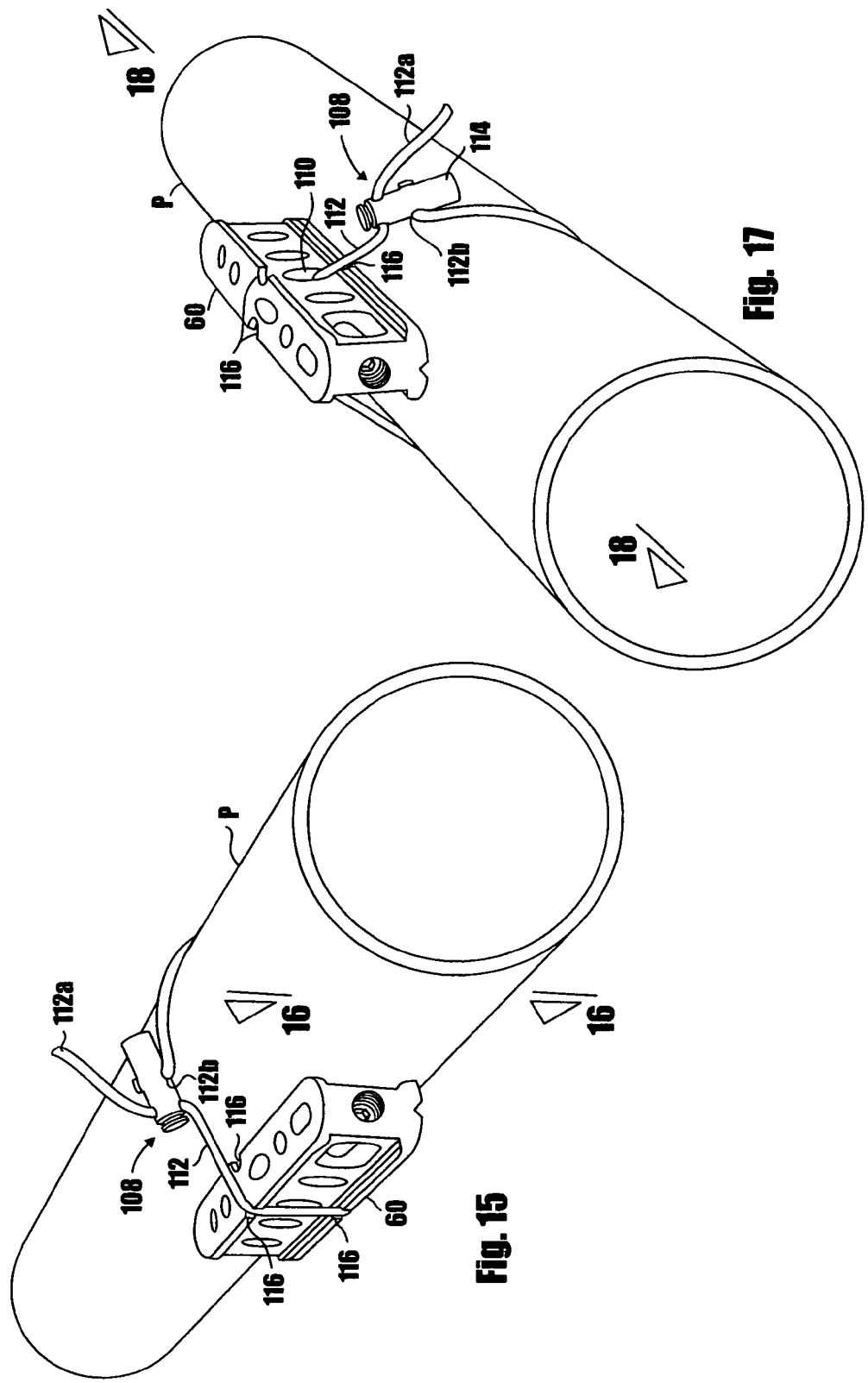
FIG. 15 is a generally perspective view of the leveling device shown in FIG. 9 interconnected with a side of an elongated pipe.

As illustrated in FIG. 15 of the drawings, strap assembly 108 can also be used to interconnect the level with the side of the pipe "P". In this regard, the upper and lower rails of the body 62 of the level are provided with transversely spaced apart notches 116 that are constructed and arranged to receive and locate the elastomeric strap, the ends of which are interconnected by the connector member 114 in the manner previously described.

Another important feature of the level device of the present invention resides in the provision of a conventional bulls-eye level 120 that is connected to the top rail 64 of the body 62.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention as set forth in the following claims.

The invention claimed is:

1. A level for determining the orientation of a structure comprising:
 (a) a body including:
  (i) a top rail having transversely spaced apart, chamfered sides;
  (ii) a bottom rail having transversely spaced apart, chamfered sides;
  (iii) first and second vial chambers, each having a threaded opening;
 (b) a first bubble vial disposed within said first vial chamber;
 (c) a second bubble vial disposed within said second vial chamber;
 (d) a first threaded connector receivable within said threaded opening of said first vial chamber for movement from a first position to a second position in engagement with said first bubble vial to secure said first bubble vial within said first vial chamber; and (e) a second threaded connector receivable within said threaded opening of said second vial chamber for movement from a first position to a second position in engagement with said second bubble vial to secure said second bubble vial within said second vial chamber.

2. The level as defined in claim 1 in which said chamfer on said top and bottom rails is between about 60 and 80 degrees.

3. The level as defined in claim 1 in which said first and second threaded connectors each comprises a cap screw.

4. The level as defined in claim 1 in which said bottom rail includes a bottom surface having at least one magnet connected thereto.

5. The level as defined in claim 1, in which said chamfered sides of each of said top and bottom rails includes a notch.

6. The level as defined in claim 5 in which said body includes a through opening.

7. A level for determining the orientation of an elongate pipe comprising:
   (a) a body including:
      (i) a top rail having transversely spaced apart, chamfered sides;
      (ii) a bottom rail having transversely spaced apart, chamfered sides;
      (iii) first, second and third vial chambers, each of said first, second and third vial chambers having a threaded opening;
   (b) a bubble vial disposed within each of said first, second and third vial chambers of said body; and
   (c) a threaded connector receivable within said threaded opening of each of said first, second and third vial chambers for movement between first and second positions to secure said bubble vials within said vial chambers.

8. The level as defined in claim 7 in which at least one of said first and second vial chambers is disposed at an angle with respect to said top surface of said body.

9. The level as defined in claim 7 in which at least one of said first and second vial chambers is disposed in a substantially perpendicular relationship with said top surface of said body.

10. The level as defined in claim 7 in which said body further includes a fourth vial chamber having a threaded opening, a bubble vial disposed within said fourth vial chamber and a threaded connector receivable within said threaded opening of said fourth vial chamber for movement between first and second positions to secure said bubble vial within said fourth vial chamber.

11. The level as defined in claim 7 further including a plurality of magnets connected to said bottom rail of said body.

12. The level as defined in claim 7 further including a bulls-eye level connected to said top rail of said body.

13. The level as defined in claim 7 in which said chamfer on said top and bottom rails is approximately 70 degrees.

14. The level as defined in claim 7, in which said chamfered sides of each of said top and bottom rails includes a notch.

15. The level as defined in claim 7 in which said body includes a through opening.

16. A level assembly for determining the orientation of an elongate pipe comprising a level and a connector cord for connecting said level to the elongate pipe, said level comprising:
   (a) a body including:
      (i) a top rail having transversely spaced apart, chamfered sides;
      (ii) a bottom rail having transversely spaced apart, chamfered sides;
      (iii) first, second and third vial chambers, each of said first, second and third vial chambers having a threaded opening and each of said first and second file chambers being disposed at an angle with respect to said top rail;
   (b) a bubble vial disposed within each of said first, second and third vial chambers of said body; and
   (c) a threaded connector receivable within said threaded opening of each of said first, second and third vial chambers for movement between first and second positions to secure said bubble vials within said vial chambers.

17. The level as defined in claim 16 further including a plurality of magnets connected to said bottom rail of said body for connecting said level to the elongated pipe.

18. The level as defined in claim 16, in which said chamfered sides of each of said top and bottom rails includes a notch for receiving said connector cord.

19. The level as defined in claim 18 in which said body includes a through opening for receiving said connector cord.

* * * * *